US007379953B2

(12) United States Patent
Luo et al.

(10) Patent No.: US 7,379,953 B2
(45) Date of Patent: May 27, 2008

(54) SYSTEMS AND METHODS FOR RESOURCE-ADAPTIVE WORKLOAD MANAGEMENT

(75) Inventors: Gang Luo, Yorktown Heights, NY (US); Philip Shilung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 11/063,168

(22) Filed: Feb. 22, 2005

(65) Prior Publication Data
US 2006/0190430 A1    Aug. 24, 2006

(51) Int. Cl.
G06F 17/30 (2006.01)
(52) U.S. Cl. .................. 707/205; 707/10; 707/200; 707/206
(58) Field of Classification Search ............ 707/3, 707/2, 10; 718/105
See application file for complete search history.

(56) References Cited

U.S. PATENT DOCUMENTS

| 5,301,317 | A  | * | 4/1994 | Lohman et al. ............ 707/2 |
|-----------|----|---|--------|--------------------------------|
| 5,325,525 | A  | * | 6/1994 | Shan et al. ............... 718/104 |
| 5,535,364 | A  | * | 7/1996 | Resman et al. .......... 711/151 |
| 6,353,818 | B1 | * | 3/2002 | Carino, Jr. ............... 707/2 |
| 6,678,065 | B1 | * | 1/2004 | Hikawa ................... 358/1.13 |
| 6,934,826 | B2 | * | 8/2005 | Lubbers et al. ........... 711/170 |
| 7,035,989 | B1 | * | 4/2006 | Hinker et al. ............ 711/171 |
| 7,062,558 | B2 | * | 6/2006 | Rolia ...................... 709/226 |
| 7,174,379 | B2 | * | 2/2007 | Agarwal et al. .......... 709/226 |
| 7,185,167 | B2 | * | 2/2007 | Sollich .................... 711/173 |
| 7,194,451 | B2 | * | 3/2007 | Chaudhuri et al. ......... 707/2 |
| 2003/0065688 | A1 | * | 4/2003 | Dageville et al. .......... 707/205 |

OTHER PUBLICATIONS

Niu et al. Workload adaptation in automatic DBMS, IBM Centre for Advanced Studies Conference, Article 13, pp. 1-13, 2006.*
Masmano et al. TLSF: a new dynamic memory allocator for real-time system, Real-Time System, 2004, pp. 79-88, Jun. 30-Jul. 2, 2004.□□.*
Li et al. Dynamic Memory Allocation and Data Sharing Schedule Server, Multimedia and Expo, 2007 International Conference, pp. 72-75, Jul. 2-5, 2007.*
Faloutsos et al. Flexible and adaptable buffer management techniques management systems, vol. 44, Issue. 4, pp. 546-560, Apr. 1995.*
Chaudhuri et al., "Estimating Progress of Execution for SQL Queries", SIGMOD Conference; Jun. 2004, pp. 803-814. Paris, France.

(Continued)

*Primary Examiner*—Baoquoc N To
(74) *Attorney, Agent, or Firm*—Këusey, Tutunjian & Bitetto, P.C.; Mark Wardas

(57) ABSTRACT

Systems and methods are provided for resource adaptive workload management. In a method thereof, at least one execution objective is received for at least one of a plurality of queries under execution. A progress status of, and an amount of resource consumed by, each of the plurality of queries are monitored. A remaining resource requirement for each of the plurality of queries is estimated, based on the progress status of, and the amount of resource consumed by, each of the plurality of queries. Resource allocation is adjusted based on the at least one execution objective and the estimates of the remaining resource requirements.

22 Claims, 4 Drawing Sheets

OTHER PUBLICATIONS

Luo et al., "Toward a Progess Indicator for Database Queries", SIGMOD Conf, Jun. 2004, pp. 791-802, Paris, France.

Luo et al., Increasing the Accuracy and Coverage of SQL Progress Indicators:, http://www.cs.wisc.edu/~gangluo/PI.pdf, Sep. 2004, pp. 1-12.

Robert Abbott et al., "Scheduling Real-Time Transactions with Disk Resident Data", Proceedings of the Fifteenth Int'l. Conf. on Very Large Data Bases, pp. 385-396, Amsterdam, 1989.

Robert Abbott et al., "Scheduling Real-time Transactions: a Performance Evaluation", Proceedings of the 14th VLDB Conf., pp. 1-12, Los Angeles, CA 1988.

* cited by examiner

SYSTEMS AND METHODS FOR RESOURCE-ADAPTIVE WORKLOAD MANAGEMENT

BACKGROUND

1. Technical Field

The description generally relates to workload management and, more particularly, to systems and methods for resource-adaptive workload management.

2. Description of the Related Art

Workload management for Relational Database Management Systems (RDBMS) has been extensively studied in the database literature. Every major commercial RDBMS comes with workload management tools. However, due to a lack of information about the progress of queries running in the RDBMS, the existing tools cannot always make intelligent decisions.

For example, consider the following scheduled maintenance problem. At time 0, planning begins for the scheduled maintenance (e.g., deciding the maintenance start time t, which queries should have their execution blocked, and so forth). The maintenance may involve installing some new software on the computer, or adding several new data server nodes to the parallel RDBMS. The maintenance is scheduled to begin at time t. A common practice is to perform the following two operations (designated O1 and O2):

O1: Starting from time 0, new queries are no longer allowed to enter into the RDBMS for execution.

O2: The existing queries in the RDBMS are kept running until time t. At time t, we abort those queries that have not finished execution. This is lost work, since those queries need to be rerun after the RDBMS is restarted.

One issue to be addressed in the preceding scenario is how can the maintenance time t be chosen to minimize the amount of lost work without over-delaying the maintenance. In general, the state-of-the-art RDBM workload management tools do not know which queries can finish by time t. As a result, they cannot provide much aid in suggesting a "good" maintenance time. Rather, the database administrator (DBA) needs to guess an arbitrary maintenance time that he or she thinks is appropriate. However, if it can be estimated which queries can finish by time t, then more intelligent decisions can be made to prepare for the scheduled maintenance. For example, in this case, the operation O2 can be replaced with the following two operations (designated O2' and O3):

O2': The queries that cannot finish by time t are estimated. These queries are aborted at time 0. Note that aborting the queries will reduce the load on the RDBMS and, thus, change the estimate about which queries cannot finish by time t.

O3: Other queries in the RDBMS are kept running. Suppose at time t, some of these queries have not finished execution. Such a scenario is possible if our estimation has errors. Then, at time t, the queries that have not yet finished are either aborted or allowed to run to completion. The appropriate action depends on both the application requirement and the estimate of how soon those queries are going to finish subsequent to time t.

Compared to operation O2, operations O2' and O3 have the following advantages: (1) even for the same maintenance time t, by aborting some "hopeless" queries at time 0, more queries can be allowed to finish by time t; (2) the amount of lost work can be controlled by adjusting the maintenance time t.

As a second example, suppose that for some reason, the DBA needs to speed up the execution of a target query Q. The DBA decides to do this by choosing one running query (the victim query) and blocking its execution. In this case, a common approach is to choose the victim query to be the heaviest resource consumer. However, if it happens that this victim query will finish quickly, then blocking the execution of this query will not speed up the execution of the target query Q as much as blocking some other query that has a longer remaining execution time. In this example, if the remaining execution times of the running queries are estimated, the choosing of a victim query that is about to finish can be avoided.

From the above discussion, it can be seen that it is desirable to achieve the following two goals: (1) give the workload management tool more information about the remaining execution time of the running queries; and (2) let the workload management tool use this information to make more intelligent decisions.

Regarding the first goal, recently progress indicators for SQL queries in RDBMSs have been proposed in the following, all of which are incorporated by reference herein in their entireties: Chaudhuri et al., "Estimating Progress of Execution for SQL Queries", Special Interest Group on Management Of Data (SIGMOD) Conf., June 2004, pp. 803-814; Luo et al., "Toward a Progress Indicator for Database Queries", SIGMOD Conf., June 2004, pp. 791-802; and Luo et al., "Increasing the Accuracy and Coverage of SQL Progress Indicators", Proc. 2005 Int. Conf. on Data Engineering (ICDE'05), Tokyo, Japan, April 2005, pp. 853-864. In each of the preceding references, for an SQL query, a progress indicator keeps track of the work completed and continuously estimates the remaining query execution time. Suppose progress indicators are integrated into the workload management tool. Then at any time, for each query running in the RDBMS, the workload management tool can estimate the amount of remaining work and the remaining query execution time this is the extra information about the state of the query (relating to the first goal above).

It is to be noted that the progress indicator described in the above-referenced article entitled "Estimating Progress of Execution for SQL Queries" does not try to predict the remaining query execution time.

The progress indicators in the above-referenced articles entitled "Toward a Progress Indicator for Database Queries" and "Increasing the Accuracy and Coverage of SQL Progress Indicators" estimate the remaining query execution time in the following way. For a query Q, at any time, the progress indicator uses a query execution plan and an intermediate result generated thus far to estimate the remaining cost c that is measured in U's. Each U represents one unit of work that is equal to that required to process one page of bytes. The progress indicator also monitors the current query execution speed s. The remaining query execution time t is estimated as $t=c/s$.

From the above description, it can be seen that in estimating the remaining execution time of a query Q, the above-referenced articles entitled "Toward a Progress Indicator for Database Queries" and "Improving the Accuracy and Coverage of SQL Progress Indicators" do not consider the predicted remaining execution time for concurrently running queries.

Accordingly, with respect to the first goal, it would be desirable and highly advantageous to have an apparatus and method for estimating remaining query execution time by at least considering the predicted remaining execution time for concurrently running queries.

Moreover, with respect to the second goal, it would be desirable and highly advantageous to have a system and method for enabling a workload management tool to use additional information about the remaining execution time of running queries to render more intelligent decisions regarding managing the workload.

It is to be noted that transaction scheduling has been studied in a real-time database system. See, for example, Abbott et al., "Scheduling Real-time Transactions: a Performance Evaluation", Very Large Databases (VLDB) Conf., pp. 1-12, 1988; and Abbott et al., "Scheduling Real-Time Transactions with Disk Resident Data", VLDB Conf., pp. 385-396, 1989. Regarding the preceding transaction scheduling articles, the main concern is to meet deadlines rather than to maximize resource utilization. Moreover, most real-time systems are memory resident and the jobs there can be finished in a short amount of time (say, less than a few seconds). Hence, they need special time-cognizant protocols (e.g., to handle critical sections). Further, many real-time systems use hard deadlines. As a result, the jobs there are usually pre-defined (i.e., "canned" jobs). Also, almost all jobs there have deadlines.

Accordingly, it would be desirable and highly advantageous to have an apparatus and method that maximizes resource utilization, does not require special time-cognizant protocols, and is capable of handling non-fixed deadlines.

SUMMARY

The present invention is directed to systems and methods for resource-adaptive workload management.

According to an aspect of the present invention, there is provided a method for resource adaptive workload management. At least one execution objective is received for at least one of a plurality of queries under execution. A progress status of, and an amount of resource consumed by, each of the plurality of queries are monitored. A remaining resource requirement for each of the plurality of queries is estimated, based on the progress status of, and the amount of resource consumed by, each of the plurality of queries. Resource allocation is adjusted based on the at least one execution objective and the estimates of the remaining resource requirements.

According to another aspect of the present invention, there is provided a program storage device readable by machine, tangibly embodying a program of instructions executable by the machine to perform method steps for resource adaptive workload management. At least one execution objective is received for at least one of a plurality of queries under execution. A progress status of, and an amount of resource consumed by, each of the plurality of queries are monitored. A remaining resource requirement for each of the plurality of queries is estimated, based on the progress status of, and the amount of resource consumed by, each of the plurality of queries. Resource allocation is adjusted based on the at least one execution objective and the estimates of the remaining resource requirements.

According to still another aspect of the present invention, there is provided an apparatus for resource adaptive workload management. An execution objective receiving apparatus is for receiving at least one execution objective for at least one of a plurality of queries under execution. A status monitor is for monitoring a progress status of, and an amount of resource consumed by, each of the plurality of queries. An estimation module is for estimating a remaining resource requirement for each of the plurality of queries, based on the progress status of, and the amount of resource consumed by, each of the plurality of queries. An adjustment module is for adjusting resource allocation based on the at least one execution objective and the estimates of the remaining resource requirements.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
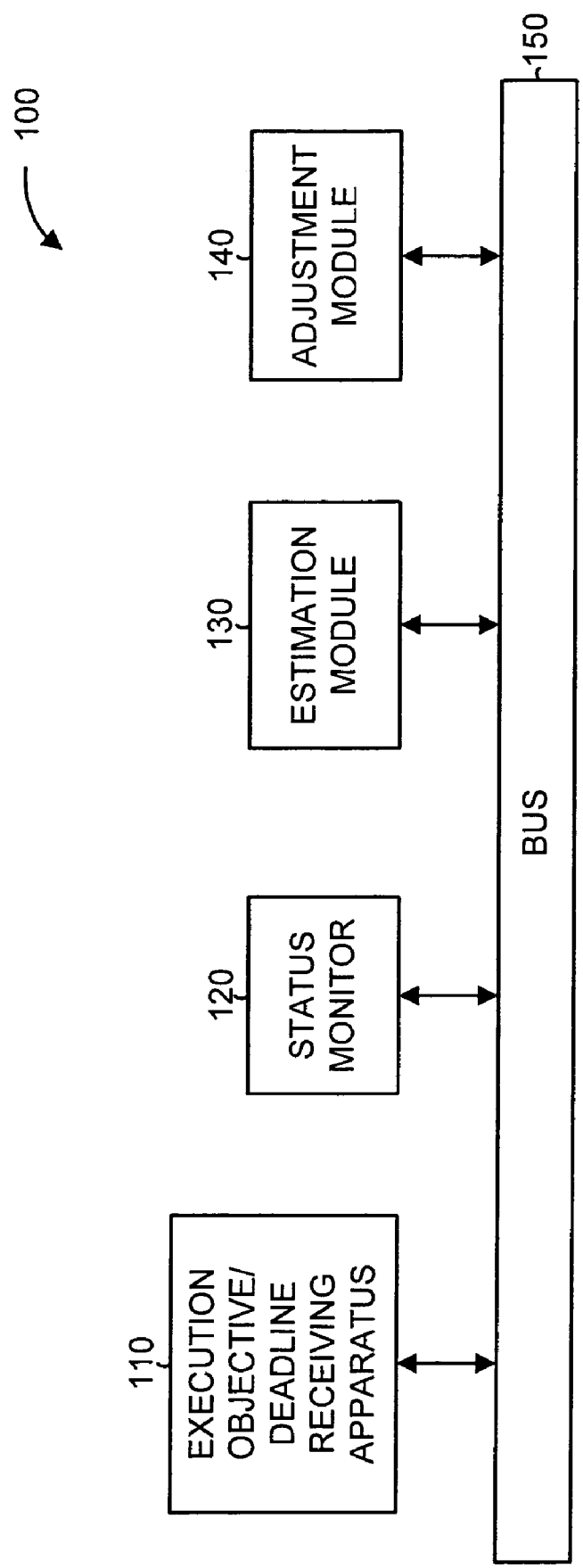
FIG. 1 is a block diagram illustrating a system 100 for resource-adaptive workload management, according to an illustrative embodiment of the present invention.

The present invention is directed to systems and methods for resource-adaptive workload management.

The present description illustrates the principles of the invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

FIG. 1 is a block diagram illustrating a system 100 for resource-adaptive workload management, according to an illustrative embodiment of the present invention. The system 100 includes an execution objective/deadline receiving apparatus 110, a status monitor 120, an estimation module 130, an adjustment module 140, and a bus 150 for interconnecting the preceding elements. The functions of the preceding elements are described herein after.

Figure 2:
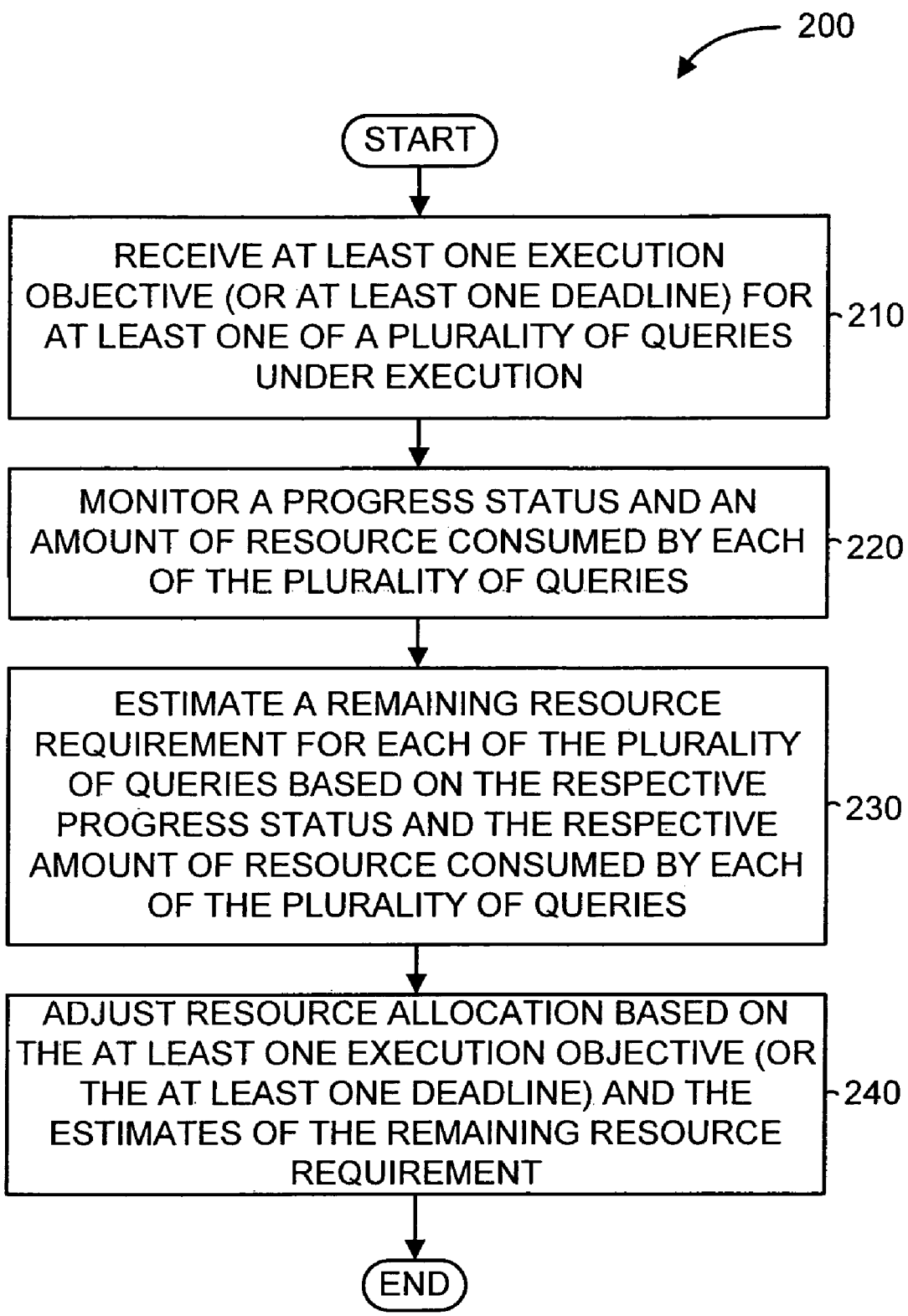
FIG. 2 is a flow diagram illustrating a method 200 for resource-adaptive workload management, according to an illustrative embodiment of the present invention.

FIG. 2 is a flow diagram illustrating a method 200 for resource-adaptive workload management, according to an illustrative embodiment of the present invention.

At least one execution objective (or at least one deadline) is received by the execution objective/deadline receiving apparatus 110 for at least one of a plurality of queries under execution (step 210). It is to be appreciated that the while delineated separately, an execution objective may be considered to include or to be a query deadline.

The progress status and amount of resource consumed by each of the plurality of queries is monitored by the status monitor 120 (step 220).

The remaining resource requirement for each of the plurality of queries is estimated by the estimation module 130 based on the respective progress status and the respective amount of resource consumed by each of the plurality of queries (step 230).

Resource allocation is adjusted by the adjustment module 140 based on the at least one execution objective (or the at least one deadline) and the estimates of the remaining resource requirement (step 240).

A description will now be given regarding estimating remaining query execution time. This description regarding the estimation of remaining query execution time will address initial simplifying assumption for the solutions described herein, the actual estimation method itself, non-empty query admission queues, and corresponding implementation issues.

A description will now be given regarding initial simplifying assumptions for the solutions described herein.

The initial simplifying assumptions will first be described. The removal of these assumptions is described herein after.

Assumption 1: The system capacity is a constant C. At any time, no matter how many queries (e.g., m queries) are running in the RDBMS, as long as m≦1, the RDBMS can process C units of work per second in total for all these m queries.

Assumption 2: The current time is time 0. At time 0, there are n queries running in the RDBMS: $Q_1, Q_2, \ldots,$ and $Q_n$. For each query $Q_i$ (1≦i≦n), both the exact remaining cost $c_i$ and the exact amount of work $e_i$ that has been completed for $Q_i$ are known.

Assumption 3: Query $Q_i$ (1≦i≦n) has priority $p_i$. The corresponding weight for priority $p_i$ is $w_i$. In the case that all n queries $Q_1, Q_2, \ldots,$ and $Q_n$ run concurrently, each query $Q_i$ (1≦i≦n) is executed at speed $$s_i = \frac{w_i}{W} C,$$

where $$W = \sum_{j=1}^{n} w_j.$$

In general, if m (m≦n) queries are running in the RDBMS, then the execution speed of a query Q is $$s(Q) = \frac{w(Q)}{SW} C,$$

where w(Q) is the weight of query Q, and SW is the sum of the weights of all the m queries.

A description will now be given regarding the estimation method. It is to be appreciated that the estimation method of the present invention is capable of predicting the remaining execution time for concurrently running queries.

The estimates provided by the estimation method are based on a snapshot of the RDBMS at time 0 (the n queries $Q_1, Q_2, \ldots,$ and $Q_n$). To estimate the remaining query execution time, the n queries $Q_1, Q_2, \ldots,$ and $Q_n$ are sorted in the ascending order of $c_i/s_i$. That is, after sorting, we have $$\frac{c_1}{s_1} \leq \frac{c_2}{s_2} \leq \ldots \leq \frac{c_n}{s_n},$$

or equivalently, $$\frac{c_1}{w_1} \leq \frac{c_2}{w_2} \leq \ldots \leq \frac{c_n}{w_n} \quad (1)$$

The purpose of this sorting will become obvious from the discussion below.

The entire period of executing the n queries $Q_1, Q_2, \ldots,$ and $Q_n$ are divided into n stages. At the end of each stage, a query finishes execution. Stage i (1≦i≦n) lasts for time $t_i$. This case is called "the standard case", and is repeatedly referred to herein after.

Figure 3:
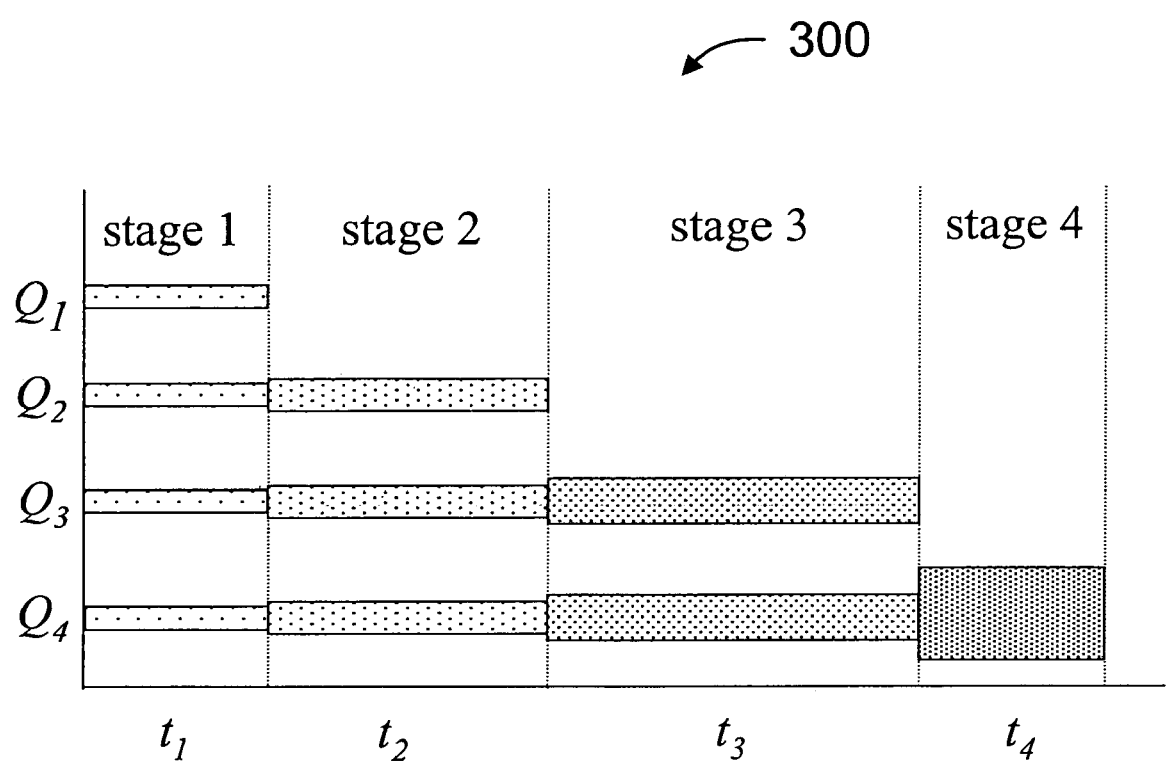
FIG. 3 is a diagram illustrating a sample execution 300 of four queries to which the present invention may be applied, according to an illustrative embodiment of the present invention.

To provide an indication of how the n queries will behave, a sample execution 300 of four queries (n=4) is shown in FIG. 3. Each of these four queries have the same priority. At the end of stage i ($1 \leq i \leq n$), query $Q_i$ finishes execution. During each stage i ($1 \leq i \leq n$), the amount of work completed for query $Q_j$ ($i \leq j \leq n$) is represented as a rectangle, where the height of the rectangle represents the execution speed of $Q_j$.

The estimation method of the invention will now be described in further detail.

The description of the estimation method will begin with stage 1 thereof. Recall that $$\frac{c_1}{s_1} \leq \frac{c_2}{s_2} \leq \ldots \leq \frac{c_n}{s_n}.$$

Hence, among all the n queries $Q_1, Q_2, \ldots,$ and $Q_n$, query $Q_1$ will be the first one to finish execution. Actually, it will finish at time $$t_1 = \frac{c_1}{s_1}.$$

During stage 1, for each i ($2 \leq i \leq n$), the amount of work completed for query $Q_i$ is $$a_i^{(1)} = s_i \times t_1 = s_i \times \frac{c_1}{s_1} = c_1 \times \frac{w_i}{w_1}.$$

Hence, at the end of stage 1, the remaining cost of query $Q_i$ ($2 \leq i \leq n$) is $$c_i^{(1)} = c_i - a_i^{(1)} = c_i - c_1 \times \frac{w_i}{w_1}.$$

The description of the estimation method will now continue with stage 2. During stage 2, there are n−1 queries running in the RDBMS: $Q_2, Q_3, \ldots,$ and $Q_n$. Each query $Q_i$ ($2 \leq i \leq n$) is executed at speed $$s_i^{(1)} = \frac{w_i}{W^{(1)}} C,$$

where $$W^{(1)} = \sum_{j=2}^{n} w_j = W - w_1.$$

For each i ($2 \leq i \leq n$), $$\frac{c_i^{(1)}}{s_i^{(1)}} = \frac{c_i}{w_i} \times \frac{W^{(1)}}{C} - \frac{c_1}{C} \times \frac{W^{(1)}}{w_1}.$$

According to Equation (1):

$$\frac{c_2}{w_2} \leq \frac{c_3}{w_3} \leq \ldots \leq \frac{c_n}{w_n}.$$

Hence, $$\frac{c_2^{(1)}}{s_2^{(1)}} \leq \frac{c_3^{(1)}}{s_3^{(1)}} \leq \ldots \leq \frac{c_n^{(1)}}{s_n^{(1)}}.$$

That is, among the n−1 queries $Q_2, Q_3, \ldots,$ and $Q_n$, query $Q_2$ will be the first one to finish execution. Actually, after stage 1, it will take time $t_2$ to finish query $Q_2$, where $$t_2 = \frac{c_2^{(1)}}{s_2^{(1)}}.$$

During stage 2, for each i ($3 \leq i \leq n$), the amount of work completed for query $Q_i$ is $$a_i^{(2)} = s_i^{(1)} \times t_2 = s_i^{(1)} \times \frac{c_2^{(1)}}{s_2^{(1)}} = c_2^{(1)} \times \frac{w_i}{w_2}.$$

Hence, at the end of stage 2, the remaining cost of query $Q_i$ ($3 \leq i \leq n$) is $$\begin{aligned} c_i^{(2)} &= c_i^{(1)} - a_i^{(2)} \\ &= c_i^{(1)} - c_2^{(1)} \times \frac{w_i}{w_2} \\ &= c_i - c_1 \times \frac{w_i}{w_1} - \left( c_2 - c_1 \times \frac{w_2}{w_1} \right) \times \frac{w_i}{w_2} \\ &= c_i - c_2 \times \frac{w_i}{w_2}. \end{aligned}$$

This procedure is repeated for all of the n stages one by one to compute every $t_i$ ($1 \leq i \leq n$). By induction, it has been found that the n queries $Q_1, Q_2, \ldots,$ and $Q_n$ will finish in the order $Q_1, Q_2, \ldots,$ and $Q_n$. That is, at the end of each stage i ($1 \leq i \leq n$), query $Q_i$ finishes execution. At time 0, the remaining execution time of query $Q_i$ ($1 \leq i \leq n$) is $$r_i = \sum_{j=1}^{i} t_j.$$

By a simple analysis, the following two points can be shown. The first point is that the dominant cost of the estimation method is to sort the n queries $Q_1, Q_2, \ldots,$ and $Q_n$ in the ascending order of $c_i/s_i$. Hence, the time complexity of the estimation method is $O(n \times \ln n)$. The second point is that the space complexity of the estimation method is $O(n)$.

A description will now be given regarding non-empty query admission queues.

In the above discussion, it is presumed that the query admission queue is empty. In general, the query admission queue may not be empty, and the estimation method described herein can extend its visibility into the future by examining this queue in a straightforward way. In general, if predictions can be made in the future regarding which queries will arrive at the RDBMS at what time, then the effect of these future queries can be considered when the remaining execution time of currently running queries is estimated.

A description will now be given regarding implementation issues.

To implement the above method, the query admission/scheduling policy and the information (e.g., remaining cost, execution speed) of all queries in the RDBMS (both running queries and queries waiting in the admission queue) should be known. This can be achieved with the following method. An array $A_r$ is maintained that keeps the information of all queries in the RDBMS. Each time a query Q enters the RDBMS, no matter whether Q starts execution immediately or is put into the query admission queue, its information is registered in the array $A_r$. During query Q's execution, Q's information that is registered in the array $A_r$ is continuously updated. When query Q finishes, Q's information is removed from the array $A_r$. Whenever remaining query execution time is to be estimated, the information stored in the array $A_r$ is used.

A description will now be given regarding workload management.

For illustrative purposes, six workload management problems are described herein. However, it is to be appreciated that the present invention is not limited to solving only the six illustrative workload management problems described herein and, thus, other workload management problems as well as variants of the problems described herein may also be solved thereby.

The six workload management problems are as follows: single-query speed up problem; multiple-query speed up problem; scheduled maintenance problem; deadline checking problem; meeting deadline problem (block lowest priority query); and meeting deadline problem (blocking fewest number of queries). It is to be appreciated that the meeting deadline problem (block lowest priority query) is also interchangeably referred to herein as the "first meeting deadline problem", and the meeting deadline problem (blocking fewest number of queries) is also interchangeably referred to herein as the "second meeting deadline problem".

Variants of these workload management problems are frequently encountered in practice. Under the same assumptions as that discussed above with respect to the initial simplifying assumptions, for each workload management problem, it is shown how to solve the problem by using the estimated query execution time and converting the estimated query execution time into a mathematical optimization problem. It is to be appreciated that the estimates obtained by the method described herein may be used in other ways and for other purposes relating to workload management, as readily determined by one of ordinary skill in the related art, while maintaining the scope of the present invention. Thus, the examples provided herein regarding using estimated query execution time to improve the quality of the decisions made by workload management tools are merely illustrative and other examples and applications there for may also be employed in accordance with the principles described herein while maintaining the scope thereof.

In the description provided herein, for illustrative purposes, it is presumed that the n queries $Q_1, Q_2, \ldots,$ and $Q_n$ are numbered so that:

$$\frac{c_1}{s_1} \leq \frac{c_2}{s_2} \leq \ldots \leq \frac{c_n}{s_n}.$$

Except for the scheduled maintenance problem, for the other five workload management problems described herein, in order to reach certain desirable effects, the solutions described herein may speed up the execution of some queries at the expense of slowing down other queries. However, the solutions described herein do not change the throughput of the RDBMS. This is because it is presumed that the RDBMS is always fully utilized (Assumption 1).

Workload management decisions are made based on the current system status (the n queries $Q_1, Q_2, \ldots,$ and $Q_n$). In practice, queries keep arriving at the RDBMS for execution and our old decisions may no longer be valid or optimal. To solve this problem, the following strategy is adopted. For each query that arrives in the future, one of the following illustrative approaches may be taken. In one approach, the old decisions are used. In another approach, the old decisions are checked. If the old decisions are no longer valid or optimal, some new decisions (e.g., blocking the execution of more running queries) are made based on the new system status. Alternatively, unless the old decisions are far from optimal (e.g., exceed a pre-specified, dynamically configurable threshold), the old decisions are used. In yet another approach, the new query is put into the admission queue. Alternatively, if the new query will cause major changes to the system status (e.g., the load on the RDBMS), the new query is put into the admission queue. The specific action depends on application requirements.

A description will now be given regarding the single-query speed up problem.

The single-query speed up problem is defined as follows. Suppose it is desired to speed up the execution of the target query $Q_i$ ($1 \leq i \leq n$). A natural choice is to increase the priority of query $Q_i$. However, if query $Q_i$ is already of the highest priority, then the only thing that can be done is to either block the execution of one or more other queries, or lower the priority of one or more other queries. In this description, only the first alternative is considered.

Presume at time 0, it is desired to speed up the execution of query $Q_i$ as much as possible by blocking the execution of $h \geq 1$ victim queries. Then, it needs to be determined which h queries are the optimal h victim queries that should be chosen to block their execution. This is the single-query speed up problem.

The simple case where h=1 is first described, and then the general case where $h \geq 1$ is described.

The solution to the single-query speed up problem (h=1) will now be described.

Intuitively, it is preferable that the optimal victim query $Q_v$ ($1 \leq v \leq n$, $v \neq i$) satisfies the following two conditions as much as possible:

C1: $Q_v$ should be the heaviest resource consumer.

C2: If not blocked, $Q_v$ should run for the longest time (at least longer than $Q_i$).

In other words,

C1: The weight $w_v$ of Query $Q_v$ should be the largest.

C2: $c_v/s_v$ or v (since all queries are sorted in the ascending order of $c_j/s_j$) should be the largest.

In general, it is not always possible to find a victim query that satisfies both conditions simultaneously. Rather, the optimal victim query should be chosen based on a tradeoff between these two conditions. This tradeoff leads to a mathematical optimization problem.

The sketch of the method described herein is as follows. The n−1 queries $Q_1, Q_2, \ldots, Q_{i-1}, Q_{i+1}, Q_{i+2}, \ldots,$ and $Q_n$ are divided into two sets: $S_1 = \{Q_1, Q_2, \ldots, Q_{i-1}\}$ and $S_2 = \{Q_{i+1}, Q_{i+2}, \ldots, Q_n\}$. In either set $S_j$ (j=1, 2), the best candidate victim query $Q_{v_j}$ is selected. This is achieved by quantifying the "benefit" of speeding up the execution of the target query $Q_i$ that is gained by blocking the execution of the victim query. The optimal victim query $Q_v$ is the better one between $Q_{v_1}$ and $Q_{v_2}$.

The method directed to the above-described single-query speed up problem includes the following three steps.

Step 1: The queries $Q_{i+1}, Q_{i+2}, \ldots,$ and $Q_n$ in set $S_2$ are examined. In this case, condition C2 does not matter, as each query $Q_j$ (i+1≤j≤n) runs longer than query $Q_i$. To satisfy condition C1 as much as possible, a natural choice is to choose query $Q_{v_2}$ to be the query with the highest weight. That is:

$$w_{v_2} = \max\{w_j | i+1 \leq j \leq n\}.$$

This choice is justified formally. Suppose the victim query $Q_m$ (i+1≤n≤n) is chosen. To compute the "benefit" of blocking the execution of query $Q_m$ at time 0, the following technique is used. The entire period of executing the n−1 queries $Q_1, Q_2, \ldots, Q_{m-1}, Q_{m+1}, \ldots,$ and $Q_n$ is divided into n stages. During each stage j (1≤j≤n), except for query $Q_m$, the amount of work completed for query $Q_k$ (1≤k≤n, k≠m) remains the same as that in the standard case (recall that the standard case is defined herein above with respect to the estimation method).

Figure 4:
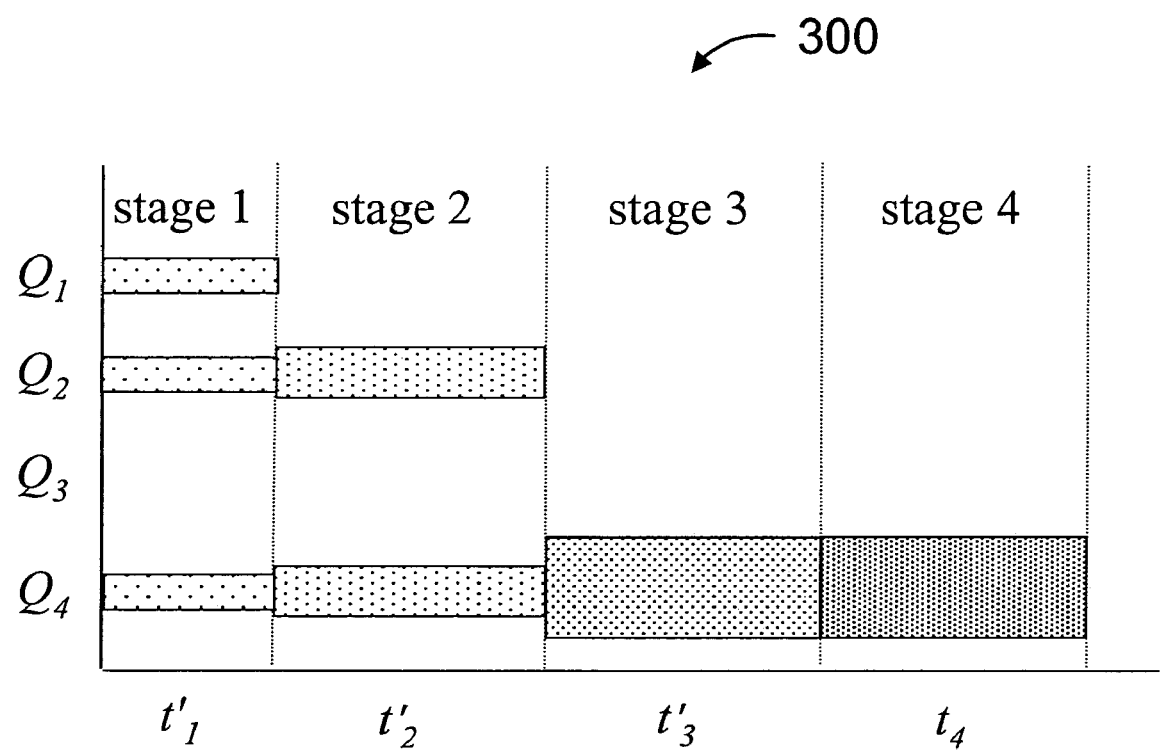
FIG. 4 is a diagram illustrating the sample execution 300 of FIG. 4, where the execution of query $Q_3$ is blocked at time 0, according to an illustrative embodiment of the present invention.

For example, for the case shown in FIG. 3, if the execution of query $Q_3$ at time 0 is blocked, then the sample execution 300 of the four queries becomes what is shown in FIG. 4.

It is easy to see that: (1) except for stage m, at the end of each stage j (1≤j≤n, j≠m), a query ($Q_j$) finishes execution; and (2) at stage j (1≤j≤i), compared to the standard case, the execution of each query $Q_k$ (j≤k≤n, k≠m) is sped up by a factor of $$\frac{\sum_{p=j}^{n} w_p}{\sum_{p=j}^{n} w_p - w_m}.$$

As a result, the duration of stage j is shortened from $t_j$ to $$t'_j = \frac{\sum_{p=j}^{n} w_p - w_m}{\sum_{p=j}^{n} w_p} \times t_j.$$

In other words, the duration of stage j is shortened by the following:

$$\Delta t_j = t_j - t'_j = \frac{w_m}{\sum_{p=j}^{n} w_p} \times t_j.$$

Hence, the remaining execution time of query $Q_i$ is shortened by the following:

$$T_m = \sum_{j=1}^{i} \Delta t_j = \sum_{j=1}^{i} \frac{t_j}{\sum_{p=j}^{n} w_p} \times w_m.$$

To maximize $T_m$, $w_m$ should be maximized.

Step 2: Now the queries $Q_1, Q_2, \ldots,$ and $Q_{i-1}$ in set $S_1$ are examined. Suppose the victim query $Q_m$ (1≤m≤i−1) is chosen. To compute the "benefit" of blocking the execution of query $Q_m$ at time 0, step 1 is again used. The entire period of executing the n−1 queries $Q_1, Q_2, \ldots, Q_{m-1}, Q_{m+1}, \ldots,$ and $Q_n$ is divided into n stages. During each stage j (1≤j≤n), except for query $Q_m$, the amount of work completed for query $Q_k$ (1≤k≤n, k≠m) remains the same as that in the standard case.

It is easy to see that: (1) except for stage m, at the end of each stage j (1≤j≤n, j≠m), a query ($Q_j$) finishes execution; and (2) at stage j (1≤j≤m), compared to the standard case, the execution of each query $Q_k$ (j≤k≤n, k≠m) is sped up by a factor of:

$$\frac{\sum_{p=j}^{n} w_p}{\sum_{p=j}^{n} w_p - w_m}.$$

As a result, the duration of stage j is shortened by the following:

$$\Delta t_j = \frac{w_m}{\sum_{p=j}^{n} w_p} \times t_j.$$

Each stage j (m+1≤j≤n) is the same as that in the standard case.

Hence, the remaining execution time of query $Q_i$ is shortened by the following:

$$T_m = \sum_{j=1}^{m} \Delta t_j.$$

Actually, $T_m = c_m/C$. This is because in the first i stages, by blocking the execution of query $Q_m$ at time 0, $c_m$'s amount of work is saved in total. To maximize $T_{v_1}$, query $Q_{v_1}$ should be chosen such that:

$$c_{v_1} = \max\{c_m | 1 \leq m \leq i-1\}.$$

Step 3: The optimal victim query $Q_v$ is chosen to be the better one between $Q_{v_1}$ and $Q_{v_2}$. That is, $$T_v = \max\{T_{v_1}, T_{v_2}\}.$$

From the above analysis, it can be seen that at time 0, by blocking the execution of a victim query $Q_m$ ($1 \leq m \leq n$) whose remaining execution time is $r_m$, no more than $r_m$'s amount of time can be saved for the execution of each other query $Q_k$ ($1 \leq k \leq n$, $k \neq m$). This provides an explanation of the undesirable scenario in the query speed up problem that is mentioned at the beginning of the introduction: if the victim query will finish in a short amount of time, blocking its execution will not help much in speeding up the execution of the target query Q.

By a simple analysis, it can be shown that: (1) the time complexity of the above solution to the single-query speed up problem is $O(n \times \ln n)$; and (2) the space complexity of the above solution to the single-query speed up problem is $O(n)$.

A description will now be given regarding equal priority within the context of the single-query speed up problem. In discussing equal priority, the special case where all the n queries $Q_1, Q_2, \ldots,$ and $Q_n$ are of the same priority is considered. In this case, the solution to the problem is greatly simplified as follows: (1) if i<n, then the optimal victim query is any query $Q_j$ (i+1$\leq$j$\leq$n); and (2) if i=n, then the optimal victim query is query $Q_{n-1}$.

The time complexity of this solution to the single-query speed up problem is $O(n)$. This is because in this case, there is no need to either sort the n queries $Q_1, Q_2, \ldots,$ and $Q_n$ in the ascending order of $c_j/s_j$ or compute all the $t_j$'s ($1 \leq j \leq n$). Rather, given the target query Q whose remaining cost is c, to find the optimal victim query, only the following two queries are to be found (if they exist). The first query's remaining cost is no more than c. Among all the queries whose remaining costs are no more than c, this query (the optimal victim query) has the largest remaining cost. The second query's remaining cost is no less than c. The preceding two queries can be found by scanning all the n queries $Q_1, Q_2, \ldots,$ and $Q_n$ (at most) once.

A description will now be given regarding the general case ($h \geq 1$) in the context of the single-query speed up problem.

Suppose the h victim queries are chosen to be queries $Q_{g_1}, Q_{g_2}, \ldots,$ and $Q_{g_h}$, where $$\{g_1, g_2, \ldots, g_h\} \subseteq \{1, 2, \ldots, n\} - \{i\}.$$

Presume that by blocking the execution of query $Q_{g_j}$ ($1 \leq j \leq h$) at time 0, the remaining execution time of query $Q_i$ is shortened by $T_{g_j}$. From an analysis similar to that described above with respect to the solution provided for the single-query speed up problem, it can be shown that by blocking the execution of the h victim queries $Q_{g_1}, Q_{g_2}, \ldots,$ and $Q_{g_h}$ at time 0, the remaining execution time of query $Q_i$ is shortened by $$\sum_{j=1}^{h} T_{g_j}.$$

Based on this observation, the following greedy method is used to deal with the general case of our single-query speed up problem. The optimal victim query is chosen according to the solution described above with respect to the single-query speed up problem. Then, among the remaining queries, the next optimal victim query is chosen. This procedure is repeated h times to get h victim queries. These h victim queries are the optimal h victim queries.

A description will now be given regarding the multiple-query speed up problem.

The multiple-query speed up problem is defined as follows. Suppose at time 0, it is desired to block the execution of a single query (the victim query) to speed up the execution of the other n−1 queries. Then, it needs to be determined which query should be blocked. This is the multiple-query speed up problem.

The solution to the multiple-query speed up problem will now be described. Suppose the victim query $Q_m$ ($1 \leq m \leq n$) is chosen. As described above with respect to the solution to the single-query speed up problem:

(1) for each j ($1 \leq j \leq m$), compared to the standard case, the duration of stage j is shortened by $$\Delta t_j = \frac{w_m}{\sum_{p=j}^{n} w_p} \times t_j.$$

(2) Each stage j ($m+1 \leq j \leq n$) is the same as that in the standard case.

At each stage j ($1 \leq j \leq m$), n-j queries $Q_j, Q_{j+1}, \ldots, Q_{m-1}, Q_{m+1}, \ldots,$ and $Q_n$ are running, and their total response time is improved by $(n-j) \times \Delta t_j$. Hence, by blocking the execution of query $Q_m$ at time 0, the total response time of all the other n−1 queries $Q_1, Q_2, \ldots, Q_{m-1}, Q_{m+1}, \ldots,$ and $Q_n$ is improved by the following:

$$R_m = \sum_{j=1}^{m}(n-j) \times \Delta t_j = \sum_{j=1}^{m}(n-j) \times \frac{w_m}{\sum_{p=j}^{n} w_p} \times t_j.$$

In order to maximize $R_m$, the optimal victim query $Q_v$ should be chosen such that:

$$R_v = \max\{R_m | 1 \leq m \leq n \leq\}.$$

A description will now be given regarding the scheduled maintenance problem. This is the scheduled maintenance problem mentioned earlier herein. That is, with respect to performing operations O1, O2', and O3 (as described herein above), it needs to be determined how to choose the maintenance time t and also which queries to abort so that the amount of lost work is minimized without over-delaying the maintenance. In practice, the amount of lost work $L_w$ can be defined in multiple ways. For illustrative purposes, the following two cases are described herein. However, it is to be appreciated that the present invention is not limited to the following two cases with respect to defining the amount of lost work $L_w$ and, thus, other cases and definitions may also be utilized, given the teachings provided herein.

In case 1, $L_w$ is defined as the total amount of work that has been completed for all the queries that will be aborted.

In case 2, $L_w$ is defined as the total cost of all the queries that will be aborted. In this case, it is more appropriate to call $L_w$ the amount of unfinished work, since the aborted queries need to rerun after the RDBMS is restarted. In other words, by using this metric, the amount of successfully completed work by the scheduled maintenance time is maximized.

Only the solution to case 1 is described in detail herein. For case 2, the solution is the same except that $e_i$ needs to be replaced with $e_i + c_i$ for each i ($1 \leq i \leq n$). Recall that $c_i$ and $e_i$ are the remaining cost and the amount of work that has been completed for query $Q_i$ at time 0, respectively.

In the description provided herein, it is presumed that the overhead of aborting queries is negligible compared to the query execution cost. This will be true in a primarily read-only environment. In general, aborting jobs (e.g., update transactions) may introduce non-negligible overhead and such overhead may need to be considered in the estimation.

The "system quiescent time" is defined to be the time when all the n queries $Q_1, Q_2, \ldots,$ and $Q_n$ (except for those queries that are aborted, if any) finish execution. The estimated system quiescent time is the estimation of the earliest time when the system maintenance can start. Suppose for each i ($1 \leq i \leq n$), by aborting query $Q_i$ at time 0, the system quiescent time is shortened by $V_i$. It can be seen that:

$$V_i = c_i/C.$$

By aborting h queries $Q_{g_1}, Q_{g_2}, \ldots,$ and $Q_{g_h}$ at time 0, where $1 \leq h \leq n$ and $\{g_1, g_2, \ldots, g_h\} \subseteq \{1, 2, \ldots, n\}$, the system quiescent time is shortened by $$\sum_{j=1}^{h} V_{g_j}.$$

Our goal is to maximize $$\sum_{j=1}^{h} V_{g_j}$$

while minimizing $$\sum_{j=1}^{h} e_{g_j}.$$

This is the standard knapsack problem. Consequently, we use a greedy method to choose a satisfactory maintenance time (and lost work). First, the n queries $Q_1, Q_2, \ldots,$ and $Q_n$ are re-sorted in the ascending order of $e_i/V_i$ (recall that it is presumed that originally, the n queries $Q_1, Q_2, \ldots,$ and $Q_n$ are sorted in the ascending order of $c_i/s_i$). After re-sorting, the following is obtained:

$$\frac{e_{f_1}}{V_{f_1}} \leq \frac{e_{f_2}}{V_{f_2}} \leq \ldots \leq \frac{e_{f_n}}{V_{f_n}};$$

or alternatively, $$\frac{e_{f_1}}{c_{f_1}} \leq \frac{e_{f_2}}{c_{f_2}} \leq \ldots \leq \frac{e_{f_n}}{c_{f_n}},$$

where $\{f_1, f_2, \ldots, f_n\}$ is a permutation of $\{1, 2, \ldots, n\}$. Then, then the workload management tool is interacted with, and queries $Q_{f_1}, Q_{f_2}, \ldots,$ are aborted until the system quiescent time becomes satisfactory.

A description will now be given regarding the deadline checking problem.

The deadline checking problem is defined as follows. An "urgent query" is defined to be a query that has a deadline. Presume at time 0, for a specific i ($1 \leq i \leq n$), there is a deadline $D_i$ for the urgent query $Q_i$. It is desired to check whether or not the urgent query $Q_i$ can meet this deadline $D_i$. This is the original deadline checking problem.

A variant of the original deadline checking problem described immediately above is as follows. Suppose originally, the urgent query $Q_i$ can meet its deadline $D_i$. At time 0, a new query Q enters the RDBMS for execution. If query Q is allowed to run immediately, then it needs to be determined whether or not that will cause the urgent query $Q_i$ to miss its deadline $D_i$. If not, query Q can be allowed to run immediately. Otherwise, either query Q is put into the admission queue or the priority of the urgent query $Q_i$ is increased.

In this description, only the original deadline checking problem is described. The variant of the original problem is omitted, as it can be handled in a similar way by one of ordinary skill in the related art given the teachings provided herein.

The solution to the deadline checking problem will now be described. The estimation method described above is used to compute $r_i$, the remaining execution time of the urgent query $Q_i$ at time 0. Then, it is checked whether or not $r_i < D_i$.

A description will now be given regarding the meeting deadline problem (blocking lowest priority query), which is also referred to herein as the first meeting deadline problem.

The first meeting deadline problem is defined as follows. Suppose at time 0, for a specific i ($1 \leq i \leq n$), a deadline $D_i$ exists for the urgent query $Q_i$. It is known that: (a) query $Q_i$ is already of the highest priority; and (b) query $Q_i$ is going to miss its deadline $D_i$. It is desired to block the execution of a victim query so that query $Q_i$ can meet its deadline $D_i$. It is known that there exist several candidate victim queries that satisfy this condition. Among these candidate victim queries, it is desired to find the best candidate that has the lowest priority and then block its execution. Then, it needs to be determined which query is the best candidate victim query. This is the first meeting deadline problem.

The solution to the first meeting deadline problem will now be described. All the n–1 queries $Q_1, Q_2, \ldots, Q_{i-1}, Q_{i+1}, \ldots,$ and $Q_n$ are sorted in the ascending order of their priorities. A start is made from the query $Q_j$ ($1 \leq j \leq n$, $j \neq i$) that has the lowest priority. The solution described above for the single-query speed up problem is used to determine whether or not query $Q_i$ be able to meet its deadline $D_i$ if the execution of query $Q_j$ is blocked at time 0. If so, query $Q_j$ is the best candidate victim query. Otherwise, the query that has the next lowest priority is checked. A search is conducted and continued until a query is found such that by blocking its execution at time 0, query $Q_i$ can meet the deadline $D_i$. Then, this query is the best candidate victim query.

A description will now be given regarding the meeting deadline problem (blocking fewest number of queries), which is also referred to herein as the second meeting deadline problem.

The second meeting deadline problem is defined as follows. Suppose at time 0, for a specific i ($1 \leq i \leq n$), a deadline $D_i$ exists for the urgent query $Q_i$. It is known that (a) query $Q_i$ is already of the highest priority; and (b) query $Q_i$ is going to miss its deadline $D_i$. It is desired to block the execution of as few other queries (the victim queries) as possible so that query $Q_i$ can meet its deadline $D_i$. Then, it needs to be determined which several queries are the optimal victim queries. This is the second meeting deadline problem.

The solution to the second meeting deadline problem will now be described. Based on the same observation as that discussed above with respect to the general case ($h \geq 1$) for the single-query speed up problem, the following greedy method is used to deal with the second meeting deadline problem. The solution to the single-query speed up problem is used to choose the optimal victim query such that by blocking its execution, the execution of query $Q_i$ is speeded up as much as possible. If by doing this, query $Q_i$ can meet its deadline $D_i$, then no more need be done. Otherwise, among the remaining queries, the next optimal victim query is chosen and its execution is blocked. This procedure is repeated until query $Q_i$ can meet its deadline $D_i$.

A description will now be given regarding removing the assumption described above. The description provided herein relating to estimating the remaining query execution time and to the workload management problems are based on the three assumptions described above as initial simplifying assumptions. In practice, these assumptions may not be valid. Overall, the impact of removing these assumptions is that the estimated query execution time described herein is approximate, and for this reason the "advice" it gives for workload management becomes heuristic rather than guaranteed to give the optimal solution. This is discussed further herein after.

A description will now be given regarding Assumption 1. Assumption 1 states that for all the running queries, the RDBMS can process C units of work per second in total. This C is a constant that does not depend on the number of running queries in the RDBMS. Essentially, Assumption 1 says that unless there is no query running in the RDBMS, the RDBMS is always fully utilized.

In general, the RDBMS will not always be fully utilized. However, in practice, in order to maximize the return on investment, a DBA will often try to configure an RDBMS so that most of the time, the RDBMS is close-to-fully utilized (this is true in a large number of major commercial data warehouses). In these cases, Assumption 1 is close to reality. In other cases, we need to have a more accurate model for how one query impacts another's performance in a lightly loaded system, or be willing to tolerate inaccuracies in our estimates. These inaccuracies might in the worst case cause suboptimal workload management decisions.

A description will now be given regarding Assumption 2. Assumption 2 says that for each running query, the exact remaining cost (and the exact amount of work that has been completed for this query) is known. In practice, the remaining query cost may not be able to be precisely predicted. Again, this means that either a more accurate cost model is needed or that some errors may have to be accepted in the estimates.

A description will now be given regarding Assumption 3. Assumption 3 states that for each query running in the RDBMS, its execution speed is proportional to the weight associated with its priority. Approximately, this means that each running query gets its share of system resources in proportion to the weight associated with its priority. In practice, this may not be the case for a variety of reasons, ranging from the details of query interactions (e.g., a high-priority I/O-intensive query might not substantially block a low-priority CPU-intensive query) to the details of how the DBMS implements scheduling and priorities. This reduces to a situation very similar to that considered above with respect to removing Assumption 1 and, as was the case there, the solution is either to accept the errors that result from the approximate nature of the estimates, or to implement a more detailed and precise performance model.

A description will now be given regarding issues related to deadlines. The deadline checking problem and the two meeting deadline problems described above are related to deadlines. In general, since the assumptions described above may not be valid in practice, the solutions described above cannot always guarantee hard deadlines. Rather, all the deadlines discussed herein are soft deadlines, where missing the deadline may decrease the value of query results but will not cause a disaster.

There are several approaches that we can use to ensure that by using the solutions described herein, most urgent queries can meet their deadlines. The following two illustrative approaches are provided. In the fist illustrative approach, the RDBMS is periodically checked (e.g., every 15 minutes, however, other times may also be employed) to determine whether or not the urgent query can meet its deadline. If not, the execution of more queries is blocked. In the second illustrative approach, a safety factor $F>1$ is introduced. For each deadline, the deadline is divided by this safety factor F to get a shortened deadline. It is checked to determined whether or not the urgent query will meet this shortened deadline (rather than the original deadline). This is to allow a window of flexibility.

The safety factor F is an empirical number. For example, suppose that according to past statistics, it is known that if $F=1.3$ is chosen, 99% of the urgent queries can meet their deadlines. Then, it can be expected that if $F=1.3$ is chosen, 99% of the future urgent queries can also meet their deadlines.

The concrete value of the safety factor F depends on both the application requirement and the quality of the estimates: (a) the more precise the estimated query execution time, the smaller the F; and (b) the more urgent queries (in percentage) that are desired to meet their deadlines, the larger the F.

A description will now be given regarding other practical considerations. The time complexity of most of the solutions described herein is $O(n \times \ln n)$, where n is the number of queries in the RDBMS. This is a cause for some concern if n is large. However, in general, it is expected that the majority of queries are short (i.e., queries that can finish in a few seconds) and not really candidates for progress estimation or relevant individually for workload management. For this reason, it is reasonable for the purposes of workload management and progress estimation to ignore these short queries and focus on long-running queries. Thus, the effective n in the preceding formula is likely to be small and the computational cost will be small.

A description will now be given regarding advantages of the present invention, particularly with respect to prior art transaction scheduling as described herein above.

While the main concern of prior art transaction scheduling is to meet deadline rather than to maximize resource utilization, in the database workload management environment described herein, it is not desired to sacrifice resource utilization ratio in our general-purpose RDBMS. Moreover, while most real-time systems in prior art transaction scheduling are memory resident and jobs therein can be finished in a short amount of time (e.g., less than a few seconds) thereby requiring special time-cognizant protocols (e.g., to handle critical sections), in the database workload management environment described herein queries may incur substantial I/Os and run for a long time. Therefore, in the database workload management environment described herein short-term effects can be ignored and do not need special time-cognizant protocols. Further, while many real-time systems in prior art transaction scheduling use hard deadlines resulting in jobs there are usually pre-defined (i.e., "canned" jobs), in the database workload management environment described herein before the (arbitrary) queries are submitted to the RDBMS, they are not known in advance. Moreover, while almost all jobs in prior art transaction scheduling have deadlines, in the database workload management environment described herein most queries/transactions do not have deadlines.

These and other features and advantages of the invention may be readily ascertained by one of ordinary skill in the pertinent art based on the teachings herein. It is to be understood that the teachings of the invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit. The program storage device is a program storage unit. The program storage device may be, for example, but is not limited to, a semiconductor or solid state memory, magnetic tape, a removable computer diskette, a random access memory (RAM), a read-only, memory (ROM), a rigid magnetic disk and optical disk. Current examples of optical disks include compact disk-read only memory (CD-ROM), compact disk-read/write (CD-R/W) and DVD.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the invention is not limited to those precise embodiments, and that various changes and modifications may be effected therein by one of ordinary skill in the pertinent art without departing from the scope or spirit of the invention. All such changes and modifications are intended to be included within the scope of the invention as set forth in the appended claims.

What is claimed is:

1. A method for resource adaptive workload management, comprising the steps of:
receiving at least one execution objective for at least one of a plurality of queries under execution;
monitoring a progress status of, and an amount of resource consumed by, each of the plurality of queries;
estimating a remaining resource requirement for each of the plurality of queries, based on the progress status of, and the amount of resource consumed by, each of the plurality of queries; and
adjusting resource allocation based on the at least one execution objective and the estimates of the remaining resource requirements,
wherein the method is implemented in a relational database management system (RDBMS),
wherein the RDBMS has a query admission queue for storing queries prior to execution, and the method further comprises the steps of:
maintaining an array of query-related information for all queries in the RDBMS including the plurality of queries under execution and any of the queries currently stored in the query admission queue;
respectively updating the query-related information for each of the queries during executions thereof; and
wherein remaining query execution times for the queries are estimated using the query-related information stored in the array.

2. The method of claim 1, further comprising the step of dynamically adjusting the at least one execution objective during the execution.

3. The method of claim 2, wherein said adjusting step comprises the step of dynamically adjusting at least one of a job priority and a deadline of at least one of the plurality of queries.

4. The method of claim 1, wherein said monitoring step selectively monitors the progress status of each of the plurality of queries with respect to one of an amount of accomplished work and an amount of unfinished work.

5. The method of claim 1, wherein said estimating step utilizes a query execution plan to estimate an amount of accomplished work for at least one of the plurality of queries.

6. The method of claim 5, wherein said estimating step comprises the step of extrapolating the remaining resource requirement for at least one of the plurality of queries from an estimate of the amount of accomplished work and die monitored amount of resource consumed for the at least one of the plurality of queries.

7. The method of claim 1, wherein said adjusting step comprises the step of optimizing the resource allocation based on the at least one execution objective and the estimates of the remaining resource requirements.

8. The method of claim 1, wherein said estimating step is performed to include pre-executed queries, when the pre-executed queries are known in advance.

9. The method of claim 1, further comprising the steps of:
evaluating the adjusted resource allocation as new queries are placed under execution; and
further adjusting the resource allocation based on a result of said evaluating step.

10. A method for resource adaptive workload management, comprising the steps of:
Receiving at least one execution objective for at least one of a plurality of queries under execution;
Monitoring a progress status of, and an amount of resource consumed by, each of the plurality of queries;
Estimating a remaining resource requirement for each of the plurality of queries, based on the progress status of, and the amount of resource consumed by, each of the plurality of queries; and Adjusting resource allocation based on the at least one execution objective and the estimates of the remaining resource requirements, wherein the at least one execution objective comprises at least one deadline, wherein the method is implemented ;in a relational database management system (RDBMS) having a query admission queue for storing queries prior to execution, and the method further comprises the steps of:

Determining whether an execution of a new query not yet under execution will cause the at least one deadline to be missed;

placing the new query into the queue and/or increasing a priority of at least one of the plurality of queries to which the at least one deadline is directed, when the new query will cause the at least one deadline to be missed; and executing the new query, when the new query will not cause the at least one deadline to be missed.

11. A program storage device readable by machine, tangibly embodying a program of instructions executable by the machine to perform the steps of claim 10.

12. A program storage device readable by machine, tangibly embodying a program of instructions executable by the machine to perform method steps for resource adaptive workload management, the method steps comprising:

receiving at least one execution objective for at least one of a plurality of queries under execution;

monitoring a progress status of, and an amount of resource consumed by, each of the plurality of queries;

estimating a remaining resource requirement for each of the plurality of queries, based on the progress stats of, and the amount of resource consumed by, each of the plurality of queries; and adjusting resource allocation based on the at least one execution objective and the estimates of the remaining resource requirements, wherein the method is implemented in a relational database management system (RDBMS), wherein the RDBMS has a query admission queue for storing queries prior to execution, and the method further comprises the steps of:

maintaining an array of query-related information for all queries in the RDBMS including the plurality of queries under execution and any of the queries currently stored in the query admission queue;

respectively updating the query-related information for each of the queries during executions thereof; and wherein remaining query execution times for the queries are estimated using the query-related information stored in the array.

13. The program storage device of claim 12, further comprising the step of dynamically adjusting the at least one execution objective during the execution.

14. The program storage device of claim 13, wherein said adjusting step comprises the step of dynamically adjusting at least one of a job priority and a deadline of at least one of the plurality of queries.

15. The program storage device of claim 12, wherein said monitoring step selectively monitors the progress status of each of the plurality of queries with respect to one of an amount of accomplished work and an amount of unfinished work.

16. The program storage device of claim 12, wherein said estimating step utilizes a query execution plan to estimate an amount of accomplished work for at least one of the plurality of queries.

17. The program storage device of claim 16, wherein said estimating step comprises the step of extrapolating the remaining resource requirement for at least one of the plurality of queries from an estimate of the amount of accomplished work and the monitored amount of resource consumed for the at least one of the plurality of queries.

18. The program storage device of claim 12, wherein said adjusting step comprises the step of optimizing the resource allocation based on the at least one execution objective and the estimates of the remaining resource requirements.

19. The program storage device of claim 12, wherein said estimating step is performed to include pre-executed queries, when the pre-executed queries are known in advance.

20. The program storage device of claim 12, wherein the program storage device is implemented in a relational database management system (RDBMS).

21. The program storage device of claim 12, further comprising the steps of:

evaluating the adjusted resource allocation as new queries are placed under execution; and further adjusting the resource allocation based on a result of said evaluating step.

22. The program storage device of claim 12, wherein the at least one execution objective comprises at least one deadline.

* * * * *